United States Patent
Peeters

(10) Patent No.: US 9,758,405 B2
(45) Date of Patent: Sep. 12, 2017

(54) HYBRID WASTEWATER TREATMENT

(71) Applicant: HaskoningDHV Nederland B.V., Amersfoort (NL)

(72) Inventor: Tom Wil Theo Peeters, Eindhoven (NL)

(73) Assignee: HASKONINGDHV NEDERLAND B.V., Amersfoort (NL)

( * ) Notice: Subject to any disclaimer, the term of this patent is extended or adjusted under 35 U.S.C. 154(b) by 231 days.

(21) Appl. No.: 14/390,373

(22) PCT Filed: Apr. 3, 2013

(86) PCT No.: PCT/NL2013/050247
§ 371 (c)(1),
(2) Date: Oct. 2, 2014

(87) PCT Pub. No.: WO2013/151434
PCT Pub. Date: Oct. 10, 2013

(65) Prior Publication Data
US 2015/0336826 A1 Nov. 26, 2015

(30) Foreign Application Priority Data

Apr. 3, 2012 (NL) .................................... 2008598

(51) Int. Cl.
*C02F 3/12* (2006.01)
*C02F 9/00* (2006.01)
(Continued)

(52) U.S. Cl.
CPC ............... *C02F 3/104* (2013.01); *C02F 3/12* (2013.01); *C02F 3/121* (2013.01); *C02F 3/1236* (2013.01);
(Continued)

(58) Field of Classification Search
CPC ........ Y02W 10/15; C02F 3/1263; C02F 3/12; C02F 3/223; C02F 3/26; C02F 3/2846;
(Continued)

(56) References Cited

U.S. PATENT DOCUMENTS 5,643,453 A * 7/1997 Pannier .................. C02F 3/085
210/605
5,985,150 A 11/1999 Versprille et al.
(Continued)

FOREIGN PATENT DOCUMENTS

EP 0 562 466 A1 9/1993
JP 2007-136367 A 6/2007
(Continued)

OTHER PUBLICATIONS

Kato, JP 2007-136367 English Machine Translation, 2007, pp. 1-17.*
(Continued)

*Primary Examiner* — Claire Norris
(74) *Attorney, Agent, or Firm* — Gilberto M. Villacorta; Sunit Talapatra; Foley & Lardner LLP

(57) ABSTRACT

A process for the biological treatment of wastewater in which the performance of a conventional activated sludge system is improved by adding an aerobic granular biomass system in a hybrid parallel process configuration. Waste biomass and suspended material from the aerobic granular biomass system is introduced into the conventional activated sludge system for this purpose. In the hybrid process configuration the advantages of both systems are combined to produce new advantages, while drawbacks of the individual systems are reduced to great extent.

20 Claims, 2 Drawing Sheets

(51) Int. Cl.
*C02F 3/10* (2006.01)
*C02F 3/00* (2006.01)

(52) U.S. Cl.
CPC .... *C02F 2003/001* (2013.01); *C02F 2203/00* (2013.01); *C02F 2209/08* (2013.01); *C02F 2209/16* (2013.01); *C02F 2209/18* (2013.01); *Y02W 10/15* (2015.05)

(58) Field of Classification Search
CPC .. C02F 3/308; C02F 2203/004; C02F 3/1205; B01D 21/00
USPC ............. 210/620, 195.3, 253, 522, 608, 906
See application file for complete search history.

(56) References Cited

U.S. PATENT DOCUMENTS

2003/0159991 A1* 8/2003 Tay ...................... C02F 3/1263
                                                          210/620
2007/0181493 A1* 8/2007 Cote ..................... C02F 3/1215
                                                          210/605
2009/0127190 A1   5/2009 Ong et al.

FOREIGN PATENT DOCUMENTS

| JP | 2008-284427 | 11/2008 |
| JP | 2009-18263 | 1/2009 |
| JP | 2009-090161 A | 4/2009 |
| WO | WO 2007/029509 A1 | 3/2007 |
| WO | WO 2011/106848 A1 | 9/2011 |

OTHER PUBLICATIONS

Yang et al, CN 101759289 Enligh Machine Translation, 2010, pp. 1-12.*
Beun, J. J. et al., "Aerobic granulation in a sequencing batch airlift reactor," Water Research, vol. 36, No. 3, Feb. 1, 2002, pp. 702-712.
International Search Report for PCT Application No. PCT/NL2013/050247, mail date Jun. 26, 2014, 3 pages.

* cited by examiner

HYBRID WASTEWATER TREATMENT

CROSS REFERENCE TO RELATED APPLICATIONS

The present application is a National Stage of International Application No. PCT/NL2013/050247, filed Apr. 3, 2013, which claims priority to Netherland Application No. 2008598, filed Apr. 3, 2012, the entire disclosure is incorporated herein by reference in its entirety.

FIELD OF THE INVENTION

The invention relates to an improved wastewater treatment process using an activated sludge reactor in a hybrid process including an aerobic granular biomass reactor.

BACKGROUND

In common practice, wastewater treatment plants (WWTPs) include a biological process step in which part of the wastewater containing solid matter, suspended and soluble organics and nutrients, is treated by activated sludge (consisting of mainly micro-organisms). This process can take place either anaerobically or aerobically. The most widely applied process for the aerobic treatment of wastewater is called the 'conventional activated sludge' (CAS) process. It involves air or oxygen being introduced into a biological treatment reactor which contains a mixture of screened and sometimes primary treated sewage or industrial wastewater and purifying biomass, also referred to as 'activated sludge'. The mixed liquor suspended solids (MLSS) develop into a biomass-containing floc, which typically grows in suspended fluffy aggregates. The subsequent settling tank (usually referred to as "final clarifier") is used to allow the biological flocs to settle, thus separating the purifying sludge from the treated water. The settled sludge is recycled towards the biological process as 'return activated sludge' (RAS). To keep the biomass in the treatment reactor at a desired level during biomass growth, periodically part of the RAS is wasted as 'waste activated sludge' (WAS).

The CAS process is applied in a variety of configurations, comprising one or multiple tanks in parallel or sequential treatment train(s). Such tanks can for example be operated as plug-flow reactor, as continuous stirred tank reactor (CSTR) or as sequencing batch reactor (SBR). Although the CAS process is widely used, it has several important drawbacks, like: poor settling sludge characteristics, limitation to low MLSS concentrations, the tendency to develop floating sludge and a defined activated sludge residence time. These drawbacks are briefly described hereafter.

Poor Settling Sludge Characteristics

Due to its floc-like structure, the settling characteristics of activated sludge are relatively poor, even when the plant is operating well. This results in the need for large final clarifiers and accordingly high construction costs and large plant footprint. Many improvements in the past therefore focused on achieving improved separation techniques. One of them is the use of microfiltration to separate the activated sludge from the treated water in a Membrane Bio Reactor (MBR). Another one is the addition of chemicals to improve the biomass settling characteristics. In WO96/14912 a method is described that improves the settling properties of activated sludge by extracting gas and creating higher biomass density. The method of selectively withdrawing poorly settling sludge is described in EP1627854.

Limitation to Low MLSS Concentrations

The CAS process is limited to a relatively low concentration of MLSS, typically 3-5 g MLSS/L. Higher concentrations of MLSS lead to an unfavourable prolonged sludge holdup in final clarifiers and, especially during conditions with higher than average hydraulic flows, to potential sludge washout. State of the art measures to increase the level of MLSS focus on the application of microfiltration for sludge/water separation (Membrane Bio Reactors) instead of settling or the use of submerged carrier material to enhance the biomass concentration, as for example described in WO03/068694.

Floating Sludge

The CAS process coincides with a periodical occurrence of floating or very difficult to settle 'bulking sludge', a phenomenon caused by an increased growth of filamentous micro-organisms in the activated sludge flocs. Typical counteracting measures include chemical oxidation to destroy mainly the filamentous organisms or use of special biomass selection reactors prior to the activated sludge in which the growth of filamentous micro-organisms is reduced.

Defined Activated Sludge Residence Time

The CAS process for nutrient removal is typically designed with a defined activated sludge residence time in the system of 5-15 days. This time period sets a limit to the accumulation of favourable species of micro-organisms with low growth rates, which cannot be maintained in the treatment system. Measures to extend the sludge residence time include the Membrane Bio Reactor, the addition of submerged carrier material for attached growth and the use of bio-augmentation. In these bio-augmentation processes, a specific micro-organism population is cultivated and often immobilized in bio-augmentation reactors. The reactors are fed with specific substrate or integrated waste side streams from the wastewater treatment facility and then dosed to the CAS system, as described in e.g. EP0562466. Another example of such an in-situ bio-augmentation process is described in WO00/05177: it describes an external bio-augmentation reactor to enrich specific organisms in the activated sludge matrix.

The drawbacks of typical CAS systems are overcome to a large extent by the aerobic granular biomass (AGB) process and system as developed by Delft University of Technology (WO2004/024638). In this process granular biomass with a typical size of 0.2-3.0 mm is grown that has very different characteristics from the flocs as grown in CAS. For example the settling velocity of the applied granules is in the range of 5.0-50.0 m/h (in comparison: typical for CAS would be 0.5-1.0 m/h). Sludge volume indices (SW) for aerobic granular biomass are 70 ml/g or lower and typically are comparable in value after 5 and 30 minutes of settling time. In addition, MLSS concentrations can be kept at levels 2-4 times higher than in CAS systems, resulting in approx. 2-4 times more 'purification power'. Furthermore, both the layered structure of granules in aerobic, anoxic and anaerobic zones and the range in granule sizes result in a large distribution of sludge ages. This enables specific and favourable micro-organisms with low growth rates to survive in the AGB process.

However, one drawback of the AGB process is the fact that the granules need to be grown in a discontinuously fed system, in sequencing batch reactors. It has been reported that AGB can only develop and be maintained in batch-wise operations, during which slow growing micro-organisms are selected at high feed concentrations followed by a famine regime during non-feed conditions (see: WO2004/024638).

Such conditions can by definition not be established easily in continuously fed CAS systems.

Therefore, the technology cannot easily be used to retrofit continuously fed CAS systems into systems aimed at growing AGB. Replacement of the widely used continuous CAS systems would mean large capital disinvestment. Efforts to develop a continuously fed AGB system have been reported in literature but so far prove not feasible at practical conditions. Reference is made to a study on the formation and stability of aerobic granules in a continuous system: (N. Morales, et al., *Separation and Purification Technology*, volume 89, page 199-205, 2012). Efforts also have been made to replace the activated sludge in continuous MBR systems with aerobic granular biomass in order to reduce membrane fouling. It was investigated whether the activated sludge in the continuous MBR systems could be replaced by granular biomass grown in cultivation reactors or grown in granular biomass reactors. The results showed that it was not feasible to keep the aerobic granules in the MBR system: the granules deteriorated quickly (Reference: Xiufen et al., Characteristics of Aerobic Biogranules from Membrane Bioreactor System, *Journal of Membrane Science*, 287, page 294-299, 2006). As a consequence, in the current state-of-the-art, upgrading performance of existing CAS systems using aerobic granular biomass is only possible by retrofitting CAS systems into sequencing batch operated AGB reactors.

Even if in a hypothetic case granular biomass would be able to survive in CAS, the size and settling characteristics of the granules are such that in many CAS the mixing intensity is not sufficient and they will settle to the bottom and as such becoming inactive for the treatment process.

An assumed drawback of batch operated systems like the AGB system is the sensitivity to off-spec high hydraulic load fluctuations. This is because all operations take place in one tank and the feed to one tank is discontinuous. This is different from CAS systems equipped with large final clarifiers, which clarifiers can act as buffer tank to prevent sludge loss. This drawback can be counteracted by installing feed buffer tanks or adjusting feed patterns over the multiple AGB process tanks.

JP-A 2009-090161 discloses an aerobic wastewater treatment comprising a series (not a parallel arrangement) of aeration tanks. Granular flaked sludge is produced in an oscillating bed with carrier material in the first aerated tank and fed to the second tank. JP-A 2007-136368 discloses an aerobic wastewater treatment wherein sludge is granulated in a contact tank, and sludge is then fed to a downstream reactor; surplus granular sludge from the aerobic reactor is returned to the contact tank. WO 2007/029509 discloses an aerobic wastewater treatment process with sludge return, using a partitioned aerated tank and microorganisms immobilised on a carrier in the first compartment.

SUMMARY OF THE INVENTION

It was surprisingly found that the deficiencies and drawbacks of the prior art processes could be overcome by adding an AGB system to a CAS system and manipulating the sludge flows from the AGB system. The resulting hybrid process tie-in considerably improves the performance and flexibility of state-of-the-art wastewater treatment plants.

The invention thus comprises a novel process for biological treatment of wastewater in which the performance of CAS systems is improved. The addition of one or more AGB reactors serves two purposes: 1) to treat part of the raw wastewater and by doing so contribute to the overall treatment performance of the overall hybrid treatment plant and 2) by doing so synergistically enhancing the performance of the existing CAS without adding chemicals, without a full CAS system's retrofit to sequence batch operation, without using degasification measures or using membranes, without using submerged biomass support material and without bio-augmentation with cultivated special or immobilized micro-organisms produced by external substrate. Also, hydraulic load fluctuations can be accommodated while maintaining effective waste treatment.

BRIEF DESCRIPTION OF THE DRAWINGS

In the appended drawings.

DETAILED DESCRIPTION OF THE INVENTION

Figure 1:
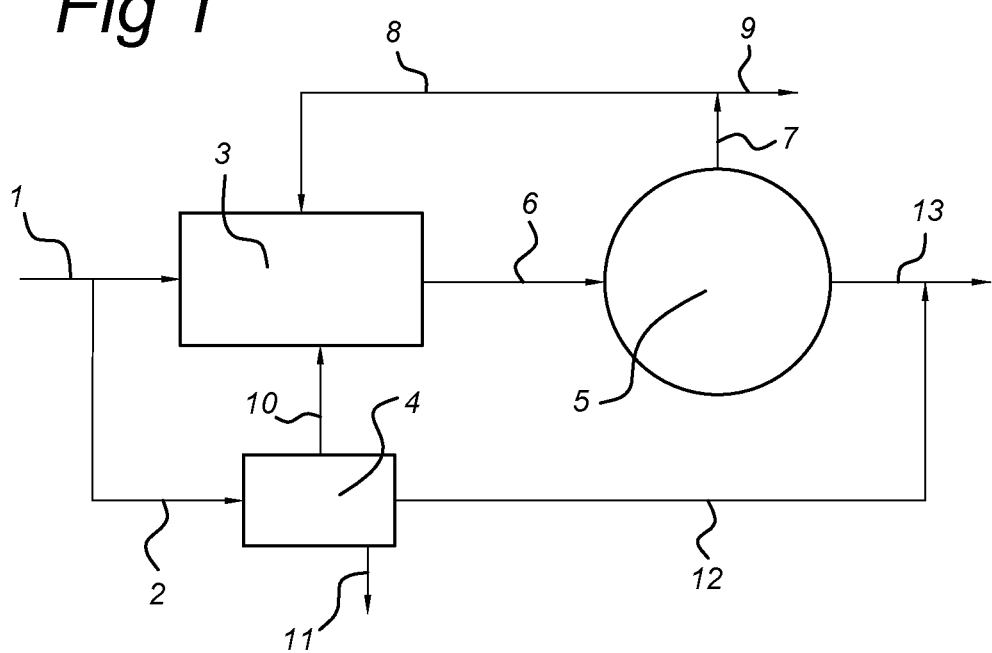
FIG. 1 schematically depicts a hybrid wastewater treatment process equipment of the invention.

The invention thus provides a wastewater treatment process comprising subjecting a part of a wastewater supply to an activated sludge process using floc-like aerobic biomass, and feeding part of the wastewater to a granular biomass process using aerobic granular biomass, wherein part of the biomass, i.e. the waste biomass and suspended solids, issuing from the granular biomass process is fed to the activated sludge process.

The activated sludge process (CAS system) and the granular biomass process (AGB reactors) are run in parallel, meaning that the main wastewater stream is split into a stream subjected to the CAS system and a stream subjected to the AGB reactor(s), and the split streams are not substantially intermixed during the treatment process, other than in low amounts accompanying biomass transfer from the AGB system to the CAS system. The parallel setup is described in more detail here below. The part of the biomass from the granular biomass process that is fed to the activated sludge process, i.e. the suspended solids, is especially the lighter part of the biomass, i.e. the part which has smaller particle sizes and/or a lower settling velocity (in particular lower settling velocity) than the part that is not fed to the CAS system, i.e. remains in the AGB reactor. Excess granular biomass from the AGB reactors is preferably not fed to the CAS system, but will be processed or reused outside the process. Excess sludge from the CAS system is preferably not fed to the granular biomass process.

As used herein, aerobic granular biomass (AGB), to be used in the granular biomass process, and floc-like aerobic biomass, to be used in the conventional activated sludge process (CAS), are distinguished by one or more characteristics:

(1) sludge volume index ($SVI_{30}$), defined as the volume in milliliters occupied by 1 g of a suspension after 30 min settling: the aerobic granular biomass has an $SVI_{30}$ which is less than 70 ml/g, preferably less than 60 ml/g, more preferably less than 50 ml/g, most preferably less than 40 ml/g; while the floc-like aerobic biomass typically has an $SVI_{30}$ of more than 70 ml/g, particularly more than 80 ml/g, more in particular between 90 and 150 ml/g; a sludge biomass as used herein can thus be referred to as granular, if the $SVI_{30}$ is less than 70 ml/g, and as floc-like, if the $SVI_{30}$ is more than 70 ml/g. In addition the corresponding SVI after 5 minutes settling, referred to as $SVI_5$ for aerobic granular biomass is less than 150 ml/g, preferably less than 100 ml/g, more preferably less than 70 ml/g, most preferably less than 60 ml/g; while the floc-like aerobic biomass has an $SVI_5$ of more than 150 ml/g, typically more than 250 ml/g, A sludge biomass as used herein can thus alternatively or additionally be referred to as granular, if the $SVI_5$ is less than 150 ml/g, and as floc-like, if the $SVI_5$ is more than 250 ml/g. (2) settling velocity, defined as the height of sludge settled per hour: the aerobic granular biomass has a settling velocity of at least 3 m/h, preferably at least 4 m/h, more preferably between 10 and 50 m/h, while the floc-like aerobic biomass has a settling velocity of less than 3 m/h, particularly less than 2 m/h, more particularly between 0.5 and 1.5 m/h; a sludge biomass as used herein can thus be referred to as granular, if the settling velocity is more than 3 m/h, and as floc-like, if the settling velocity is less than 3 m/h.

(3) average particle size: the aerobic granular biomass comprises discrete particles that after mechanical sieving in the laboratory under mild water wash has an average particle size of at least 0.2 mm, preferably between 0.4 and 3 mm, while the floc-like aerobic biomass agglomerates during mechanical sieving in the laboratory under mild water wash show an average particle size of less than 0.2 mm, particularly less than 0.1 mm; a sludge biomass as used herein can thus be referred to as granular, if the average particle size of the sludge is more than 0.2 mm, and as floc-like, if the average particle size of the sludge is less than 0.2 mm.

The part of the biomass issuing from the granular biomass process that is fed to the activated sludge process typically has characteristics which are intermediate between the characteristics of the aerobic granular biomass and of the floc-like aerobic biomass as defined above. Thus, the part of the biomass transferred from the AGB reactor(s) to the CAS system will have a sludge volume index ($SVI_{30}$) as defined above between 40 and 90 ml/g, especially between 50 and 90 ml/g, and an $SVI_5$ between 70 and 250 ml/g, especially between 150 and 250 ml/g. Likewise, the part of the biomass transferred from the AGB reactor(s) to the CAS system will have a settling velocity between 1.5 and 10 m/h, especially between 3 and 10 m/h. In addition or alternatively, the part of the biomass transferred from the AGB reactor(s) to the CAS system will have an average particle size between 0.1 and 0.4 mm.

In an advantageous embodiment, the activated sludge process of the hybrid process of the invention is operated in a conventional, continuous mode, wherein effluent from the activated sludge reactor is continuously fed to a clarifier, in which effluent is separated into a clarified liquid and a sludge fraction. The clarified liquid is preferably combined with the treated water issuing from the granular biomass process, where desired with further post-treatments. Part of the non-dissolved material (i.e. the sludge fraction) separated from the clarifier is returned to the activated sludge process and part may be discharged or further treated as described below. Alternative embodiments, such as using a sequencing batch reactor, without final clarifier, are also part of the invention.

The granular biomass process of the hybrid process of the invention is advantageously operated batch-wise. The granular process can be operated by alternating steps as also described in WO2004/024638 as follows: (a) adding wastewater to the aerobic granular biomass in a reactor while discharging treated water from the reactor, (b) supplying oxygen-containing gas, in particular air, to the added wastewater in the reactor, while keeping the oxygen level in the wastewater in the reactor between 0.2 and 5 mg/l, preferably between 0.4 and 4 mg/l, more preferably between 1 and 3 mg/l, (c) allowing the granular biomass to settle, and (d) discharging part of the biomass (suspended solids: MLSS) from the reactor; and then returning to step (a). At least part of this discharged biomass is fed it to the activated sludge process. Step (d) of the process, i.e. the discharge of part of the suspended solids, need not be included in each and every cycle of the process, depending on the relative sludge requirements of the activated sludge process and the granular process. For example, step (d) can be included in every second or third etc. cycle.

Instead of discharging treated water in step (a), i.e. at the same time as feeding raw wastewater to the reactor, treated water can be discharged together with the discharge of the part of the biomass from the reactor in step (d), i.e. prior to the feed step (a) which follows step (d). In this case, the treated water and the biomass can be fed to the activated sludge process. This is particularly useful when starting up the system.

An important feature of the present process is that the average particle size and/or settling velocity of the biomass (suspended solids) that is removed from the aerobic granular process and can be fed to the activated sludge process is lower than the average particle size and/or settling velocity of the aerobic granular biomass remaining in the aerobic granular reactor. However, the transferred biomass will have a larger particle size and/or higher settling velocity than the average particle size and/or settling velocity of the sludge in the activated sludge process, as explained above, and improves the performance of the activated sludge process.

The granular biomass process is operated in an upflow mode, wherein the wastewater in step (a) is supplied from the bottom and upwardly displaces the treated water at the top part of the reactor. The oxygen-containing gas is supplied in step (b) at the bottom of the reactor, no earlier than after the supply of the fresh wastewater. In step (c), suspended matter comprising partly granular biomass precursors, smaller granular biomass and bio-agglomerates with lower settling velocity is discharged at between 30 and 90% of the height of the reactor measured from bottom to top, while larger surplus granular biomass, can be periodically removed from the process from the bottom part of the reactor. Further details can be seen in FIG. 4 described below. Thus, two types of biomass can be discharged from the aerobic granular process: firstly the suspended solids, i.e. the relatively light, small-size and slowly settling part of granular biomass, which is frequently wasted at at least 30% of the height of the reactor from the bottom, and secondly the heavy granular biomass, which can be wasted at a lower frequency from the bottom of the reactor.

In a preferred process configuration shown in FIG. 1, an AGB reactor (4) is constructed and tied-in with the existing CAS reactor (3) is such a way that, in parallel to the CAS reactor, the AGB reactor is fed with part (2) of the incoming raw or pretreated wastewater (1) while the suspended material wasted from the aerobic granular biomass reactors (10) is frequently fed to the CAS system (3+5) and gradually results in improved capacity and purification capabilities of the CAS process. In FIG. 1 (5) depicts the final clarifier, continuously fed (6) by overflow from the CAS reactor, while (7) depicts the sludge return flow, split into RAS (8) and WAS (9). The AGB effluent (12) is taken directly to the effluent (13) from the final clarifier, for direct discharge or tertiary treatment. Larger and fully grown surplus granules are periodically wasted from the AGB reactor (11). The new AGB reactor(s) can be constructed by adding new tanks or by retrofitting part of the existing CAS reactor(s) or compartments thereof or by retrofitting existing tanks or clarifiers.

The ratio of the part of the wastewater fed to the granular biomass process and the part of the wastewater fed to the activated sludge process can be controlled depending on the quality of the wastewater. More typically the ratio of AGB flow and CAS flow is selected between 5:95 and 75:25, particularly between 10:90 and 50:50. In this way, the process configuration of the invention can be used to reduce one of the drawbacks of batch-wise fed AGB, being the challenge of handling large fluctuations in hydraulic load, with larger ratios between storm and dry weather flows as occurring in areas with combined sewer systems. For example, during storm water flow conditions, when the waste water is abundant and relatively diluted, the majority of the hydraulic load can be fed to the continuously fed CAS system and treated with the help of the final clarifier, while the hydraulic load to the AGB system is only slightly increased. On the other hand, a relatively high proportion of the wastewater can be fed to the granular biomass process in case of lower volumes of relatively concentrated wastewater, such as may occur under dry weather conditions. In particular circumstances the wastewater may be exclusively fed to the activated sludge process or to the granular process. This process configuration can significantly reduce the AGB tank volume or storm water buffer tank volume and saves on overall construction cost.

In principle, any wastewater which is not excessively toxic to the biomass used can be treated by the process of the invention. For example, the wastewater may contain organic waste at a level of between 10 mg and 8 g expressed as COD, per 1, in particular between 50 mg and 2 g COD per 1. Alternatively or in addition, the waste water may contain total nitrogen (as ammonia and/or other nitrogen compounds) at a level of between 0.2 and 1000, particularly between 1 and 75 mg per 1 (as nitrogen), which will result in at least partial removal of the nitrogen as explained below. Also, the wastewater may contain total phosphorus (as phosphate and/or other phosphorus compounds) between 0.05 and 500, particularly between 1 and 15 mg per 1 (as phosphorus).

The aforementioned process configuration can be favourably applied to increase the overall capacity of WWTPs operating with CAS systems. In this process configuration one or more new AGB reactors are constructed in a parallel treatment train, next to the existing CAS systems. The existing CAS systems are fed with large part of the raw or pretreated wastewater but a remaining part is treated by the AGB systems. By doing so, the size and capacity of the AGB treatment train for the projected extension can be made smaller because capacity and performance of the existing CAS systems is synergistically increased. Meanwhile, the small footprint of the AGB system often allows it to be built as a plant capacity extension next to the existing CAS system(s) on the same premises, which is important when footprint for plant expansion is limited or costly.

Thus, the activated sludge process, i.e. the CAS system, can comprise two, three, four, or more treatment trains run in parallel. The CAS effluent of the combined CAS reactors may be fed to a single clarifier, or alternatively each CAS reactor may be provided with its own clarifier. Preferably, each one of the multiple CAS reactors running in parallel is fed with biomass from the aerobic granular process, although the biomass feed need not be identical or continuous to each activated sludge reactor. When multiple CAS reactors are used, the granular biomass process may comprise one treatment train, or alternatively multiple granular treatment units. It is also conceivable that the process comprises a single CAS system and two, three, or more aerobic granular trains.

The hybrid configuration of AGB and CAS in parallel has an additional advantage in that an additional buffering tank is often needed to balance the discontinuous waste flow from the AGB reactor to enable continuous sludge thickening and dewatering with reduced equipment capacities. By applying the novel process configuration of this invention, all wasted biomass and other suspended material from the AGB reactor can be discontinuously fed into the parallel CAS system and further continuously be processed with the activated sludge in the CAS sludge treatment facilities.

Figure 2:
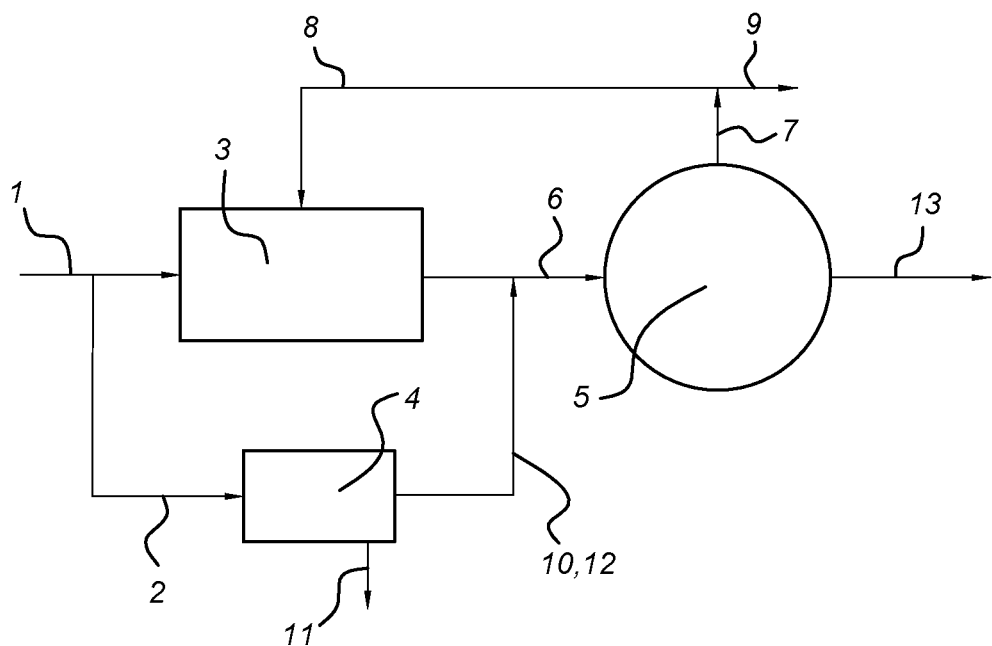
FIG. 2 schematically depicts a variation of the hybrid wastewater treatment process of the invention as operated in a start-up stage.

The unexpected advantages of the invention were tested and demonstrated. An AGB reactor was constructed for replacing an existing CAS system and for accommodating the required increased capacity and purification performance of the existing WWTP. The AGB system was operated in parallel to the CAS system as shown in FIG. 2. The clean effluent of the AGB system (12) was temporarily directed to the CAS system's final clarifier. Waste from the AGB system (10), containing suspended matter comprising partly granular biomass precursors, smaller granular biomass and bio-agglomerates, was also temporarily wasted to the existing CAS system, which was operating in parallel to the AGB. The waste material from the AGB system (4) was gradually transferred via (11-6-5-7-8) to the CAS system (3+5). This was done as a temporary measure to compensate for the reduced nutrient removal efficiency of the AGB system during start-up. It was then surprisingly found that the performance and process stability of the CAS system improved gradually but significantly as a result of this interaction with the AGB system. This improvement further developed in time when discharge of waste material no longer proceeded through (11) but directly to CAS system (3) and effluent was directly discharged to (12) after final clarifier (5), as depicted in FIG. 1.

As described above, waste sludge (suspended solids) material from the granular biomass process is directed to the activated sludge process. Also liquid effluent from the granular biomass process may be directed discontinuously to the activated sludge process.

Prior to start-up of the new AGB reactor the sludge volume indices ($DSVI_{30}$) in the CAS system was 125-175 mL/g and this significantly dropped to 75-100 mL/g without any changes made in the CAS system. As a result the biomass concentration in the CAS system could be increased from 3-4 g MLSS/L to 4-5 g MLSS/L without affecting the level of suspended solids in its effluent. Clearly, the waste biomass from the AGB system was largely captured in the CAS system, to its advantage. Moreover, the total waste biomass concentration from the CAS system increased from 8 g MLSS/L to 12 g MLSS/L in a reduced hydraulic flow towards the sludge treatment facilities.

It was surprisingly found that the micro-organism population in the CAS system had become more diverse and also featured significantly more specialized and slower growing micro-organisms than before. The biomass of the CAS system still kept its floc-like structure but became more dense with inclusions of small waste granular biomass, resulting in improved purification ability and settle ability. Also it was measured that the concentration of biopolymers and extracellular polymer substances in the CAS system's biomass had increased significantly. In addition to these findings, the existing high-loaded, fully aerated CAS system showed a strong improved ability for denitrification. A remarkable finding, because such high rate of denitrification would have been impossible based on the prevailing aerobic conditions and sludge age in the CAS system. Tests showed $NO_3^-$-N effluent concentration decreasing from 8-10 g $NO_3^-$-N/L to 3-4 g $NO_3^-$-N/L.

The particulate matter in the waste effluent of the AGB system will displace part of the activated sludge in the CAS system. This AGB waste material (suspended solids) contains fractions of tiny aerobic granules, granule precursors, bio-agglomerates and granule fractions, resulting from breaking up of larger (and older) granules. As mentioned, the AGB and parts thereof contain a highly diverse micro-organism population, including specialized and favourable slow-growing micro-organisms. It was surprisingly found that the physical characteristics of this particulate AGB waste material did not deteriorate in the CAS system and the material also did not lose its denitrification capability as typical for larger granules.

Figure 3:
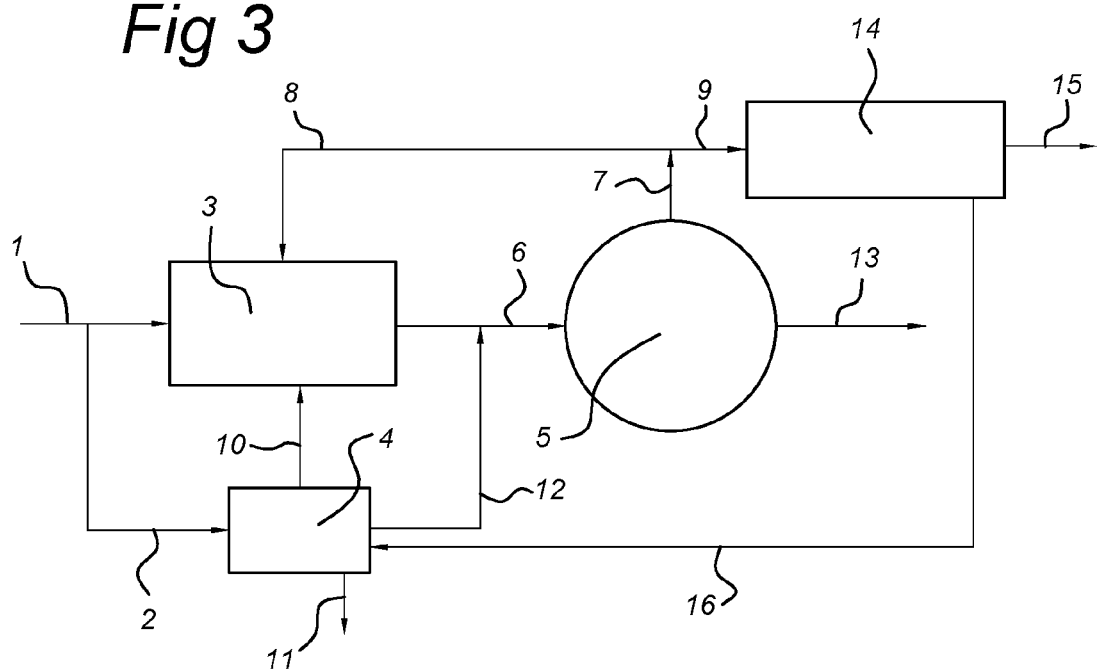
FIG. 3 schematically depicts another variation of the hybrid wastewater treatment process of the invention comprising a waste sludge processing unit.

In another process configuration the synergistic effect of operating an AGB system in hybrid configuration with a CAS system can be advantageously used to efficiently remove nitrogenous components from wastewater. It makes use of the enhanced capabilities of AGB systems to remove high levels of nitrogenous compounds from wastewater. In this process configuration, as depicted in FIG. 3, the AGB system (4) is (partly) fed by a side stream (16) of the CAS system (3+5) containing high levels of nitrogenous compounds, for example originating from a waste sludge processing unit (14). Mostly such side streams are small in volume but high in nutrient concentrations (nitrogen, phosphorus compounds) in comparison with the influent (1), which can be treated by the AGB. Examples of such side streams are: reject water from dewatering devices, decanting water from digesters, water from anoxic selection tanks and mixtures of such streams with influent. The effluent of the AGB system (12), together with its waste suspended material and/or biomass (10), is directed to the CAS system. This hybrid AGB/CAS systems process configuration proves another example of the positive effect of the addition of an AGB system to a CAS system on the overall performance of a WWTP.

Surprisingly it was found that the invention also provides a cost-effective solution to improve the capacity of biological removal of phosphorus (P) of an existing CAS system equipped with chemical P removal. For conventional biological P removal in CAS systems, anaerobic preconditioning of the activated sludge is required to get P release first before increased P uptake can take place in the CAS system under subsequent anoxic/aerobic conditions. As is known from WO 2004/024638, AGB systems have increased biological P removal capabilities, related to the proliferation of Phosphate Accumulating Organisms (PAOs) in the aerobic/anoxic layered granule. It is also known that due to pH profiles in the granule, bio-catalysed phosphate precipitation can take place, further improving the P removal capacity of the AGB system.

The invention can be used to add biological phosphate removal capacity to an existing WWTP system and combine it with improved CAS biomass settling characteristics as explained before. However, it was found that the overall biological P removal capacity of the hybrid AGB/CAS systems was much larger than could be calculated based on the sum of the two combined processes. A significant decrease in chemical dosing requirement for P precipitation in the CAS was observed, resulting in a favourable much lower chemical sludge production. It again showed that the AGB waste directed towards the CAS system resulted in replacement or union of CAS biomass flocs with small granular biomass from the AGB system. This particulate matter still featured the good biological P removal abilities under aerobic conditions in the CAS system. The invention allows additional biological P removal capacity to be introduced in the CAS system without the elaborate construction of separate anoxic and anaerobic compartments in the CAS system and with chemical P removal in the CAS system becoming less important or even superfluous.

The invention can also be used to optimize the performance of a CAS system treating wastewater mixtures including low molecular weight organics. Such compounds often result in bulking sludge by filamentous micro-organisms, which are difficult to settle. A selector tank as first step in the biological treatment process is often used to minimize this problem. In such selector tanks these components are selectively party biodegraded. It was found that when such wastewater or part of the wastewater was treated in the AGB system operating in parallel to the CAS system, part of the low weight organics were biodegraded by the AGB in anaerobic zones of the granules. This results in lower energy consumption for aeration and the production of biogas, which could be captured and utilized. Especially it was highly remarkable that anaerobic degradation of lower alcohol compounds such as methanol and ethanol was measured, since such compounds in traditional anaerobic reactors are hardly converted at all. Further it was noticed that this remarkable anaerobic treatment ability was transferred from the AGB to the CAS system in the hybrid CAS/AGB set-up. In conclusion: another configuration of the invention is operating an AGB system in parallel to a CAS system in order to improve the sludge settling characteristics while at the same time reducing the required aeration capacity in the overall WWTP.

Figure 4:
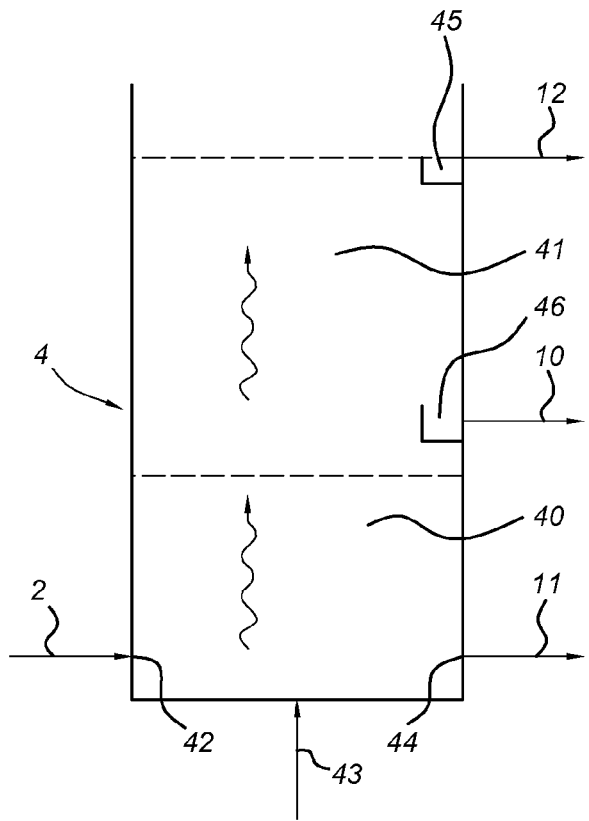
FIG. 4 schematically depicts a reactor to be used for the aerobic granular process of the invention.

The operation of the aerobic granular process is schematically illustrated in FIG. 4, showing an aerobic granular reactor 4. The reactor is operated in an up-flow mode comprising a lower bed 40 containing the larger granular biomass, and an upper part 41 containing suspended matter comprising partly granular biomass precursors, smaller granular biomass and bio-agglomerates. Wastewater 2, and optionally side stream 16, is introduced at the bottom through inlet means 42. Air is introduced through inlet 43 at the bottom with distribution means (not shown), and spent air is leaves the reactor at the top. Cleaned effluent 12 leaves the reactor through overflow and exit 45. Excess material 10, having an average particle size which is lower than the average particle size of the granular biomass in the reactor, can be discharged through exit 46, which is located somewhere between 30 and 90 of the (liquid) height of the reactor. Larger excess granular biomass 11 can be removed through outlet 44. Inlet 42 and 43 and outlets 44, 45 and 46 are preferably provided with a valve for controlling the inflow and outflow of the various streams. In particular air supply and distribution means 43 is provided with a flow regulator controlled by the oxygen level in the reactor content so as maintain an oxygen concentration in the reactor content within the required limits, i.e. 0.2-5 mg/l, for producing optimum granular biomass characteristics.

In a further advantageous process, the hybrid configuration of CAS and AGB systems is applied to target granulation in the AGB rather than waste water treatment. The produced surplus of grown granules can be harvested as valuable waste biomass and sold as seed material for new AGB systems.

The invention further comprises equipment for implementing the hybrid process configuration with AGB and CAS systems as described. Such equipment advantageously comprises an activated sludge reactor (3) with a liquid inlet, a liquid outlet, a gas inlet, a granular biomass reactor (4) with a liquid inlet (42) at the bottom of the reactor and a liquid outlet (45) at the top of the reactor and an outlet (46) at at least one third of the height of the reactor (4), a gas inlet (43) at the bottom of the reactor, a liquid line connecting an outlet of the granular biomass reactor (4) with an inlet of the activated sludge reactor (3), and preferably a separator (5) connected with a liquid outlet of the activated sludge reactor (3), the separator having a sludge outlet and a clarified liquid outlet, and further comprising a control valve for regulating the relative liquid flows to the liquid inlet of the activated sludge reactor (3) and the liquid inlet of the granular biomass reactor (4). The equipment may comprise multiple activated sludge reactors (3) and/or multiple granular biomass reactors (4) arranged in parallel.

The invention claimed is:

1. A wastewater treatment process comprising:
   (i) splitting a main wastewater stream into a first and a second wastewater stream;
   (ii) subjecting the first wastewater stream to an activated sludge process in the presence of floc-like aerobic biomass, and
   (iii) feeding the second wastewater stream to a granular biomass process operated in parallel to the activated sludge process and in the presence of aerobic granular biomass,
   wherein part of the biomass issuing from the granular biomass process is fed to the activated sludge process,
   wherein the part of the biomass fed from the granular biomass process to the activated sludge process has a lower settling velocity than a part of the biomass of the granular biomass process from the granular biomass process that is not fed to the activated sludge process and is the only biomass fed from the granular biomass process to the activated sludge process in the wastewater treatment process,
   wherein the effluent from the granular biomass process is taken directly to a final clarifier and/or is directly discharged and/or subjected to tertiary treatment,
   wherein the aerobic granular biomass has one or more of the following characteristics:
      a sludge volume index, defined as the volume in milliliters occupied by 1 g of a suspension after 30 min settling, of less than 70 ml/g;
      a settling velocity of at least 3 m/h; and
      an average particle size of at least 0.2 mm, and
   wherein the part of the biomass issuing from the granular biomass process that is fed to the activated sludge has one or more of the following characteristics:
      a sludge volume index, defined as the volume in milliliters occupied by 1 g of a suspension after 30 min settling, between 40 and 90 ml/g;
      a settling velocity between 1.5 and 10 m/h; and
      an average particle size between 0.1 and 0.4 mm.

2. The process according to claim 1, wherein the floc-like aerobic biomass has one or more of the following characteristics:
   a sludge volume index, defined as the volume in milliliters occupied by 1 g of a suspension after 30 min settling, of more than 70 ml/g;
   a settling velocity of less than 3 m/h; and
   an average particle size of less than 0.2 mm.

3. The process according to claim 1, wherein the aerobic granular biomass has a sludge volume index, defined as the volume in milliliters occupied by 1 g of a suspension after 5 min settling, less than 150 ml/g.

4. The process according to claim 1, wherein the floc-like aerobic biomass has a sludge volume index, defined as the volume in milliliters occupied by 1 g of a suspension after 5 min settling, of more than 250 ml/g.

5. The process according to claim 1, wherein the granular biomass process comprises the consecutive steps of:
   (a) adding wastewater to the aerobic granular biomass in a reactor while discharging treated water from the reactor,
   (b) supplying oxygen-containing gas to the reactor, while keeping the oxygen level in the wastewater in the reactor between 0.2 and 5 mg/l,
   (c) allowing the granular biomass to settle, and
   (d) drawing off part of the biomass from the reactor and at least partly feeding it to the activated sludge process,
   wherein the average particle size of the biomass that is drawn off is lower than the average particle size of the biomass remaining in the reactor.

6. The process according to claim 5, wherein:
   (i) the granular biomass process is operated in an up-flow mode,
   (ii) the wastewater in step (a) is supplied from the bottom and displaces the treated water, which is discharged in the same step at the top of the reactor,
   (iii) the oxygen-containing gas in step (b) is supplied at the bottom of the reactor and
   (iii) the biomass having the lower particle size in step (d) is drawn off at between 30 and 90% of the height of the reactor, measured from bottom to top.

7. The process according to claim 1, wherein the granular biomass process comprises the consecutive steps of:
   (a) adding wastewater to the aerobic granular biomass in a reactor,
   (b) supplying oxygen-containing gas to the reactor, while keeping the oxygen level in the wastewater in the reactor between 0.2 and 5 mg/l,
   (c) allowing the granular biomass to settle, and
   (d) discharging treated water from the reactor comprising drawing off part of the biomass from the reactor and at least partly feeding it to the activated sludge process,
   wherein the average particle size of the biomass that is drawn off is lower than the average particle size of the biomass remaining in the reactor.

8. The process according to claim 1, wherein the ratio of the part of the wastewater fed to the granular biomass process to the part of the wastewater fed to the activated sludge process is selected between 5:95 and 75:25.

9. The process according to claim 8, wherein the ratio is between 10:90 and 50:50.

10. The process according to claim 1, wherein the wastewater comprises:
    (i) between 10 mg and 8 g of organic waste, expressed as COD, per 1,
    (ii) between 0.2 and 1000 mg per 1 total nitrogen (as ammonia and/or other nitrogen compound), or
    (iii) between 0.05 and 500 mg per 1 total phosphorus (as phosphate and/or other phosphorus compounds).

11. The process according to claim 1, wherein the activated sludge process comprises two or more treatment trains.

12. The process according to claim 1, wherein the granular biomass process comprises one treatment train.

13. The process according to claim 1, wherein the granular biomass process comprises two or more treatment trains.

14. The process according to claim 1, wherein at least part of a side stream process, derived from the activated sludge process and containing nutrient levels higher than the initial wastewater, is returned to the granular biomass process.

15. The process according to claim 1, wherein the wastewater comprises:
 (i) between 10 mg and 8 g of organic waste, expressed as COD, per 1, and
 (ii) between 0.2 and 1000 mg per 1 total nitrogen (as ammonia and/or other nitrogen compound).

16. The process according to claim 1, wherein the wastewater comprises:
 (ii) between 0.2 and 1000 mg per 1 total nitrogen (as ammonia and/or other nitrogen compound), and
 (iii) between 0.05 and 500 mg per 1 total phosphorus (as phosphate and/or other phosphorus compounds).

17. The process according to claim 1, wherein the wastewater comprises:
 (i) between 10 mg and 8 g of organic waste, expressed as COD per 1, and
 (iii) between 0.05 and 500 mg per 1 total phosphorus (as phosphate and/or other phosphorus compounds).

18. The process according to claim 1, wherein the wastewater comprises:
 (i) between 10 mg and 8 g of organic waste, expressed as COD, per 1,
 (ii) between 0.2 and 1000 mg per 1 total nitrogen (as ammonia and/or other nitrogen compound), and
 (iii) between 0.05 and 500 mg per 1 total phosphorus (as phosphate and/or other phosphorus compounds).

19. The process according to claim 1, wherein the process is operated batch-wise.

20. An installation for carrying out the process according to claim 1, comprising:
 an activated sludge reactor with a liquid inlet, a liquid outlet, a gas inlet, a granular biomass reactor with a liquid inlet at the bottom of the reactor, one or more liquid outlets at at least one third of the height of the reactor, a liquid outlet at the bottom of the reactor and an exit for effluent connected to a clarifier and/or for discharge and/or tertiary treatment, a gas inlet at the bottom of the reactor, a liquid line connecting an outlet of the one or more liquid outlets at at least one third of the height of the granular biomass reactor with an inlet of the activated sludge reactor, and a separator connected with a liquid outlet of the activated sludge reactor, having a sludge outlet and a clarified liquid outlet, and further comprising a device for regulating the relative liquid flows to the liquid inlet of the activated sludge reactor and the liquid inlet of the granular biomass reactor.

* * * * *